United States Patent
Hamada

(10) Patent No.: US 12,258,112 B2
(45) Date of Patent: Mar. 25, 2025

(54) SYSTEM FOR AND METHOD OF CONTROLLING BEHAVIOR OF WATERCRAFT

(71) Applicant: YAMAHA HATSUDOKI KABUSHIKI KAISHA, Iwata (JP)

(72) Inventor: Satoru Hamada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 222 days.

(21) Appl. No.: 17/885,598

(22) Filed: Aug. 11, 2022

(65) Prior Publication Data

US 2023/0071146 A1    Mar. 9, 2023

(30) Foreign Application Priority Data

Sep. 6, 2021    (JP) ................................. 2021-144713

(51) Int. Cl.
  *B63B 79/10*    (2020.01)
  *B63B 79/40*    (2020.01)
  *B63H 20/10*    (2006.01)

(52) U.S. Cl.
  CPC .......... *B63H 20/106* (2013.01); *B63B 79/10* (2020.01); *B63B 79/40* (2020.01)

(58) Field of Classification Search
  CPC ......... B63B 39/00; B63B 79/40; B63B 79/10; B63H 20/106; B63H 20/10; Y02T 70/10
  See application file for complete search history.

(56) References Cited

U.S. PATENT DOCUMENTS

| | | | |
|---|---|---|---|
| 5,169,348 A * | 12/1992 | Ogiwara | B63H 20/10 440/53 |
| 8,457,820 B1 * | 6/2013 | Gonring | B63B 39/061 440/1 |
| 9,694,892 B1 * | 7/2017 | Anschuetz | B63H 20/10 |
| 9,919,781 B1 * | 3/2018 | Andrasko | B63B 79/10 |
| 10,000,267 B1 * | 6/2018 | Anschuetz | G05D 3/00 |
| 2011/0281477 A1 * | 11/2011 | Inoue | B63H 20/10 440/1 |
| 2016/0375972 A1 * | 12/2016 | Andrasko | G05D 1/0875 440/1 |
| 2017/0255205 A1 * | 9/2017 | Hashizume | G05D 1/0875 |
| 2018/0009517 A1 * | 1/2018 | Woody | B63H 21/14 |
| 2020/0130799 A1 * | 4/2020 | Gai | B63H 20/06 |
| 2021/0188406 A1 | 6/2021 | Nakatani | |

FOREIGN PATENT DOCUMENTS

JP    2021-095072 A    6/2021

* cited by examiner

*Primary Examiner* — Stephen Holwerda
(74) *Attorney, Agent, or Firm* — Keating & Bennett, LLP

(57) ABSTRACT

A system includes an outboard motor, a lift actuator, a sensor, and a controller. The sensor detects motion information indicating an up-and-down directional motion of a bow of a watercraft. The controller is configured or programmed to selectively set either a lift-up direction or a lift-down direction as a lift direction in accordance with the up-and-down directional motion of the bow based on the motion information. The controller is configured or programmed to control the lift actuator to cause the outboard motor to perform the lift motion in the lift direction, and set a duration of the lift motion to be different between when the outboard motor is caused to perform the lift motion in the lift-up direction and when the outboard motor is caused to perform the lift motion in the lift-down direction.

5 Claims, 7 Drawing Sheets

SYSTEM FOR AND METHOD OF CONTROLLING BEHAVIOR OF WATERCRAFT

CROSS REFERENCE TO RELATED APPLICATIONS

This application claims the benefit of priority to Japanese Patent Application No. 2021-144713 filed on Sep. 6, 2021. The entire contents of this application are hereby incorporated herein by reference.

BACKGROUND OF THE INVENTION

1. Field of the Invention

The present invention relates to a system for and a method of controlling a behavior of a watercraft.

2. Description of the Related Art

Chances are that pitching movement called "porpoising" occurs during high-speed navigation of a watercraft with installation of a marine propulsion device such as an outboard motor. A main reason for the occurrence of porpoising is as follows.

In high-speed navigation of the watercraft, the bow of the watercraft is elevated by a lift. When the bow of the watercraft is elevated, the center of lift is shifted rearward such that a moment acts on the watercraft to lower the bow. Accordingly, the bow of the watercraft is lowered. When the bow of the watercraft is lowered, the center of lift is shifted forward such that a moment acts on the watercraft to elevate the bow. Accordingly, the bow of the watercraft is elevated. Repetition of the motions described herein results in the occurrence of porpoising of the watercraft, that is, repetition of elevation and lowering of the bow.

A reduction in the rotational speed of an engine has been known as a technology for alleviating porpoising. Alternatively, as described in Japan Patent Application Publication No. 2021-95072, controlling the posture of a watercraft by lowering a trim tab has been known as a technology for alleviating porpoising. Both the technologies for alleviating porpoising described above inevitably cause a reduction in the velocity of the watercraft.

SUMMARY OF THE INVENTION

Preferred embodiments of the present invention each inhibit a reduction in velocity of watercrafts and simultaneously alleviate porpoising.

A system according to a preferred embodiment of the present invention controls a behavior of a watercraft. The system includes an outboard motor, a lift actuator, a sensor, and a controller. The outboard motor is attachable to the watercraft and operable to perform a lift motion up and down. The actuator causes the outboard motor to perform the lift motion in a lift-up direction and a lift-down direction. The sensor detects motion information indicating an up-and-down directional motion of a bow of the watercraft. The controller is communicably connected to the lift actuator.

The controller is configured or programmed to obtain the motion information, selectively set either the lift-up direction or the lift-down direction as a lift direction in accordance with the up-and-down directional motion of the bow based on the motion information, and control the lift actuator to cause the outboard motor to perform the lift motion in the lift direction. The controller is configured or programmed to set a duration of the lift motion to be different between when the outboard motor is caused to perform the lift motion in the lift-up direction and when the outboard motor is caused to perform the lift motion in the lift-down direction.

A method according to another preferred embodiment of the present invention relates to a method of controlling a behavior of a watercraft. The watercraft includes an outboard motor and a lift actuator. The outboard motor is operable to perform a lift motion up and down. The lift actuator causes the outboard motor to perform the lift motion in a lift-up direction and a lift-down direction. The method includes obtaining motion information indicating an up-and-down directional motion of a bow of the watercraft, selectively setting either the lift-up direction or the lift-down direction as a lift direction in accordance with the up-and-down directional motion of the bow based on the motion information, controlling the lift actuator to cause the outboard motor to perform the lift motion in the lift direction, and setting a duration of the lift motion to be different between when the outboard motor is caused to perform the lift motion in the lift-up direction and when the outboard motor is caused to perform the lift motion in the lift-down direction.

A system according to yet another preferred embodiment of the present invention controls a behavior of a watercraft. The system includes a marine propulsion device, a lift actuator, a sensor, and a controller. The marine propulsion device is attachable to the watercraft and operable to perform a lift motion up and down. The lift actuator causes the marine propulsion device to perform the lift motion in a lift-up direction and a lift-down direction. The sensor detects motion information indicating an up-and-down directional motion of a bow of the watercraft. The controller is communicably connected to the lift actuator.

The controller is configured or programmed to obtain the motion information, selectively set either the lift-up direction or the lift-down direction as a lift direction in accordance with the up-and-down directional motion of the bow based on the motion information, and control the lift actuator to cause the marine propulsion device to perform the lift motion in the lift direction. The controller is configured or programmed to set a duration of the lift motion to be different between when the marine propulsion device is caused to perform the lift motion in the lift-up direction and when the marine propulsion device is caused to perform the lift motion in the lift-down direction.

According to a preferred embodiment of the present invention, either the lift-up direction or the lift-down direction is selectively set as the lift direction in accordance with the up-and-down directional motion of the bow of the watercraft. Then, the outboard motor is caused to perform the lift motion in the set lift direction such that porpoising is alleviated. Because of this, a reduction in the velocity of the watercraft is inhibited, and simultaneously porpoising is alleviated.

On the other hand, the lift motion of the outboard motor in the lift-up direction and that in the lift-down direction are different in velocity from each other due to a traveling state of the watercraft such as a thrust. Because of this, even when the lift motion of the outboard motor in the lift-up direction and that in the lift-down direction are performed for an equal duration, it is difficult to keep the lift position of the outboard motor at a target position to alleviate porpoising.

In view of the above, according to a preferred embodiment of the present invention, a duration of the lift motion is set to be different between when the outboard motor is caused to perform the lift motion in the lift-up direction and when the outboard motor is caused to perform the lift motion in the lift-down direction. Accordingly, the lift position of the outboard motor is able to be kept at the target position to alleviate porpoising.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
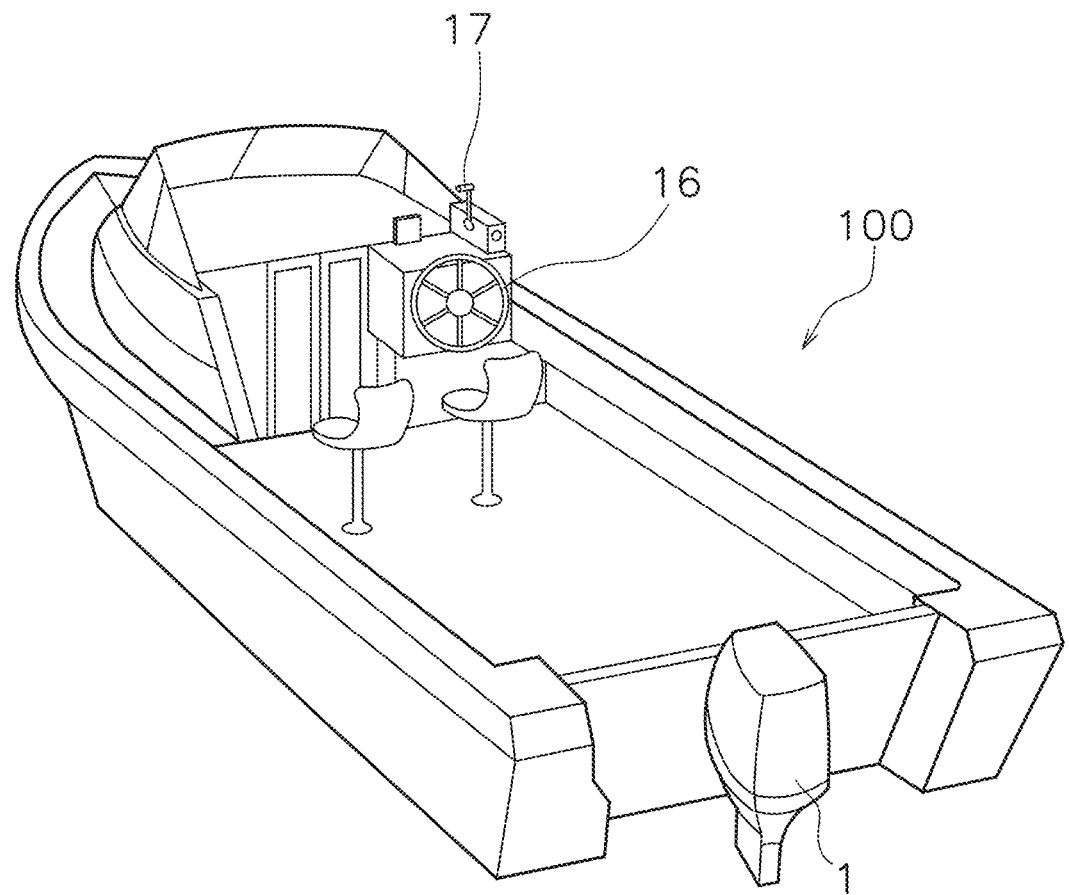
FIG. 1 is a perspective view of a watercraft according to a preferred embodiment of the present invention.
Figure 2:
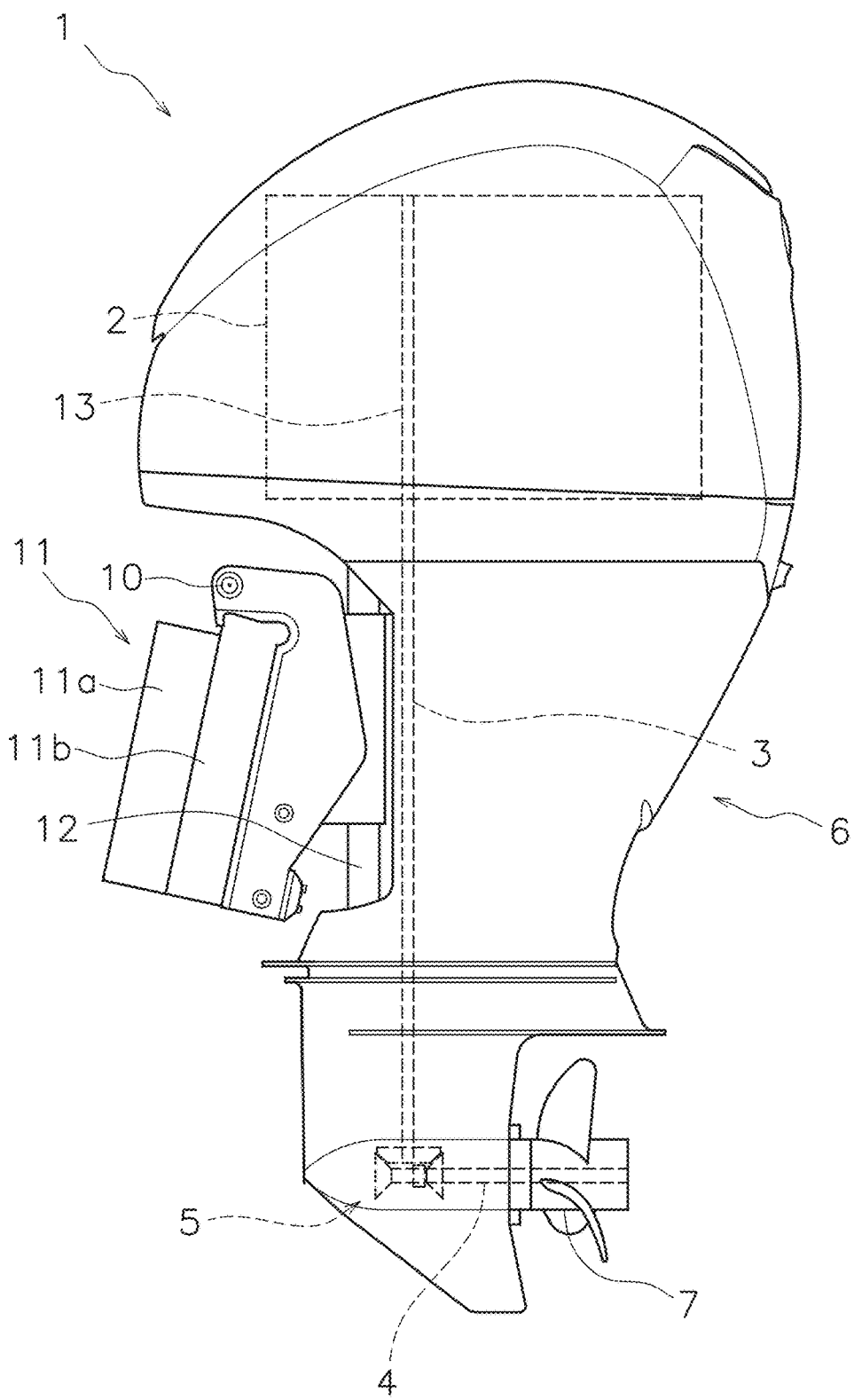
FIG. 2 is a side view of an outboard motor.

Preferred embodiments of the present invention will be explained with reference to drawings. FIG. 1 is a perspective view of a watercraft 100 according to a preferred embodiment of the present invention. The watercraft 100 is provided with an outboard motor 1 attached to the stern thereof. The outboard motor 1 generates a thrust to propel the watercraft 100. FIG. 2 is a side view of the outboard motor 1. The outboard motor 1 is attached to the watercraft 100 by a bracket 11. The bracket 11 supports the outboard motor 1 such that the outboard motor 1 is rotatable about a trim shaft 10. The trim shaft 10 extends in a right-and-left direction of the outboard motor 1. The bracket 11 supports the outboard motor 1 such that the outboard motor 1 is rotatable about a steering shaft 12. The steering shaft 12 extends in an up-and-down direction of the outboard motor 1.

The bracket 11 includes a first lift bracket 11a and a second lift bracket 11b. The first lift bracket 11a is attached to the watercraft 100. The second lift bracket 11b is attached to the outboard motor 1. The second lift bracket 11b is slidable up and down with respect to the first lift bracket 11a. With the configurations described above, the bracket 11 supports the outboard motor 1 such that the outboard motor 1 is operable to perform a lift motion in the up-and-down direction.

The outboard motor 1 includes a drive unit 2, a drive shaft 3, a propeller shaft 4, a shift mechanism 5, and a housing 6. The drive unit 2 generates the thrust to propel the watercraft 100. The drive unit 2 is, for instance, an internal combustion engine. The drive unit 2 includes a crankshaft 13. The crankshaft 13 extends in the up-and-down direction of the outboard motor 1.

The drive shaft 3 is connected to the crankshaft 13. The drive shaft 3 extends in the up-and-down direction of the outboard motor 1. The propeller shaft 4 extends in a back-and-forth direction of the outboard motor 1. The propeller shaft 4 is connected to the drive shaft 3 through the shift mechanism 5. A propeller 7 is attached to the propeller shaft 4. The shift mechanism 5 includes gears and a clutch to switch between forward movement and rearward movement. The shift mechanism 5 switches the direction of rotation transmitted from the drive shaft 3 to the propeller shaft 4. The housing 6 accommodates the drive unit 2, the drive shaft 3, the propeller shaft 4, and the shift mechanism 5.

Figure 3:
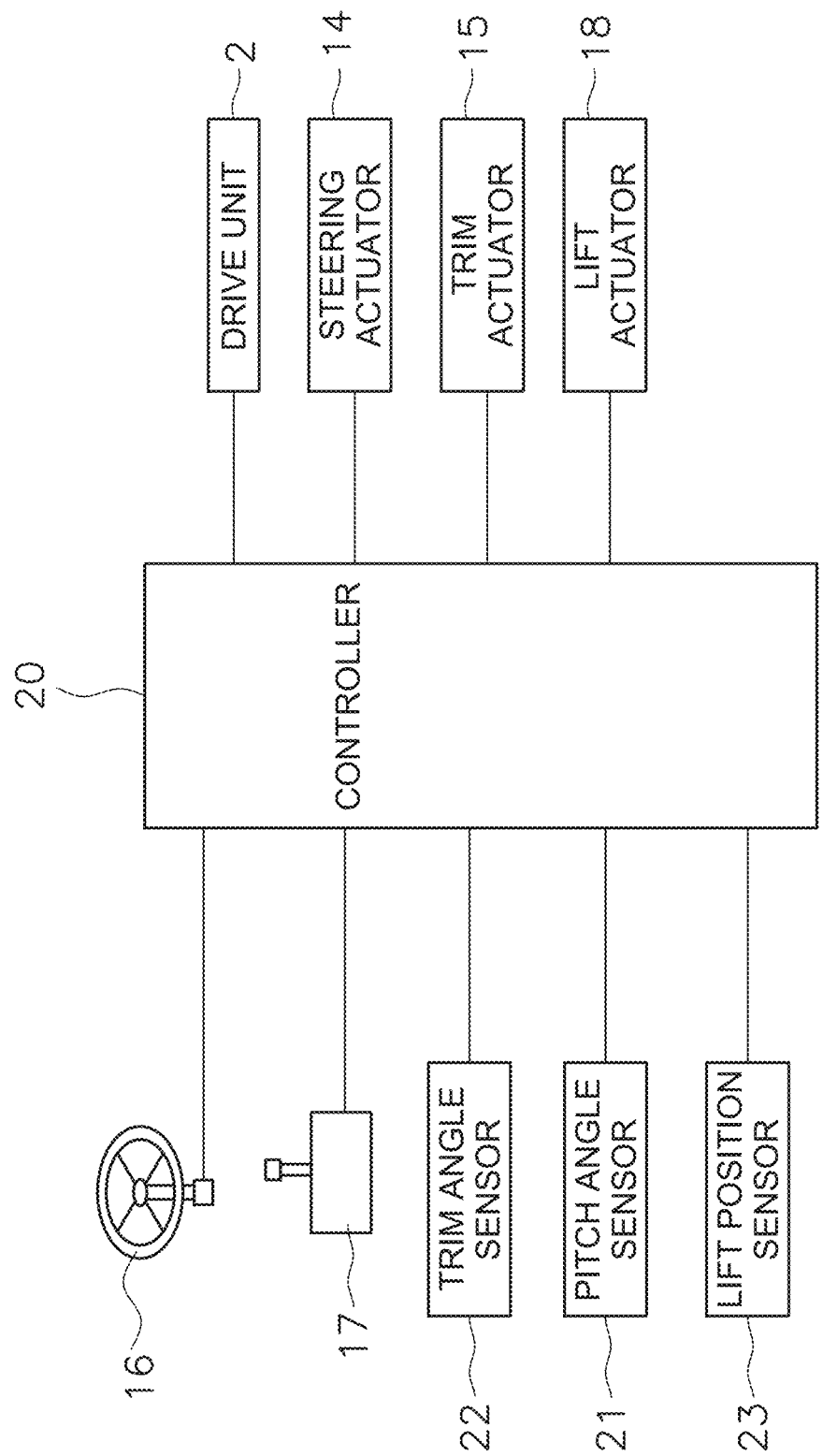
FIG. 3 is a schematic diagram for showing a configuration of a control system for the watercraft.

FIG. 3 is a schematic diagram for showing a configuration of a control system for the watercraft 100. As shown in FIG. 3, the outboard motor 1 includes a steering actuator 14, a trim actuator 15, and a lift actuator 18. The steering actuator 14 rotates the outboard motor 1 about the steering shaft 12. The steering actuator 14 is, for instance, an electric motor. However, the steering actuator 14 may be another type of actuator such as an electric cylinder, a hydraulic motor, or a hydraulic cylinder.

The trim actuator 15 rotates the outboard motor 1 about the trim shaft 10. The trim actuator 15 is, for instance, an electric motor. However, the trim actuator 15 may be another type of actuator such as an electric cylinder, a hydraulic motor, or a hydraulic cylinder. The trim actuator 15 rotates the outboard motor 1 about the trim shaft 10 such that the outboard motor 1 is caused to perform a trim motion in a trim-up direction and a trim-down direction.

The lift actuator 18 causes the second lift bracket 11b to slide against the first lift bracket 11a. The lift actuator 18 is, for instance, an electric motor. However, the lift actuator 18 may be another type of actuator such as an electric cylinder, a hydraulic motor, or a hydraulic cylinder. The lift actuator 18 causes the second lift bracket 11b to slide against the first lift bracket 11a such that the outboard motor 1 is caused to perform a lift motion in a lift-up direction and a lift-down direction.

The control system includes a steering member 16 and a throttle operating member 17. The steering member 16 and the throttle operating member 17 are provided in a cockpit of the watercraft 100. The steering member 16 is operable by an operator to manipulate a turning direction of the watercraft 100. The steering member 16 includes, for instance, a steering wheel. However, the steering member 16 may include another member such as a joystick.

The throttle operating member 17 includes, for instance, a throttle lever. The throttle operating member 17 is operable by the operator to regulate the magnitude of the thrust generated by the outboard motor 1. The throttle operating member 17 is also operable by the operator to switch the direction of the thrust generated by the outboard motor 1 between forward and rearward directions.

The control system includes a controller 20. The controller 20 includes a processor such as a CPU and memories such as a RAM and a ROM. The controller 20 stores programs and data to control the outboard motor 1. The controller 20 may include a plurality of controllers provided as discrete components.

The controller 20 is communicably connected to the drive unit 2, the steering actuator 14, the trim actuator 15, and the lift actuator 18. The controller 20 controls the drive unit 2 in accordance with operating the throttle operating member 17. The output rotational speed of the drive unit 2 is thus controlled. The controller 20 controls the steering actuator 14 in accordance with operating the steering member 16. The rudder angle of the outboard motor 1 is thus controlled.

The control system includes a pitch angle sensor 21, a trim angle sensor 22, and a lift position sensor 23. The pitch angle sensor 21 detects a pitch angle of the watercraft 100 and an angular velocity of the pitch angle (hereinafter referred to as "pitch angular velocity"). The pitch angle indicates a tilt angle of the up-and-down direction of the watercraft 100 relative to a horizontal direction. The pitch angle of the watercraft 100 and the pitch angular velocity thereof are exemplified as motion information indicating up-and-down directional motions of the bow of the watercraft 100.

The pitch angle sensor 21 includes, for instance, an IMU (Inertial Measurement Unit). The pitch angle sensor 21 outputs a pitch angle signal indicating the pitch angle of the watercraft 100 and the pitch angular velocity thereof. The trim angle sensor 22 detects a trim angle of the outboard motor 1. The trim angle indicates a rotational angle of the outboard motor 1 about the trim shaft 10 from a predetermined reference direction (e.g., vertical direction). The trim angle sensor 22 outputs a trim angle signal indicating the trim angle of the outboard motor 1.

The lift position sensor 23 detects a lift position of the outboard motor 1. The lift position indicates an up-and-down directional position of the outboard motor 1 with respect to the watercraft 100. The lift position sensor 23 outputs a lift position signal indicating the lift position of the outboard motor 1.

Figure 4:
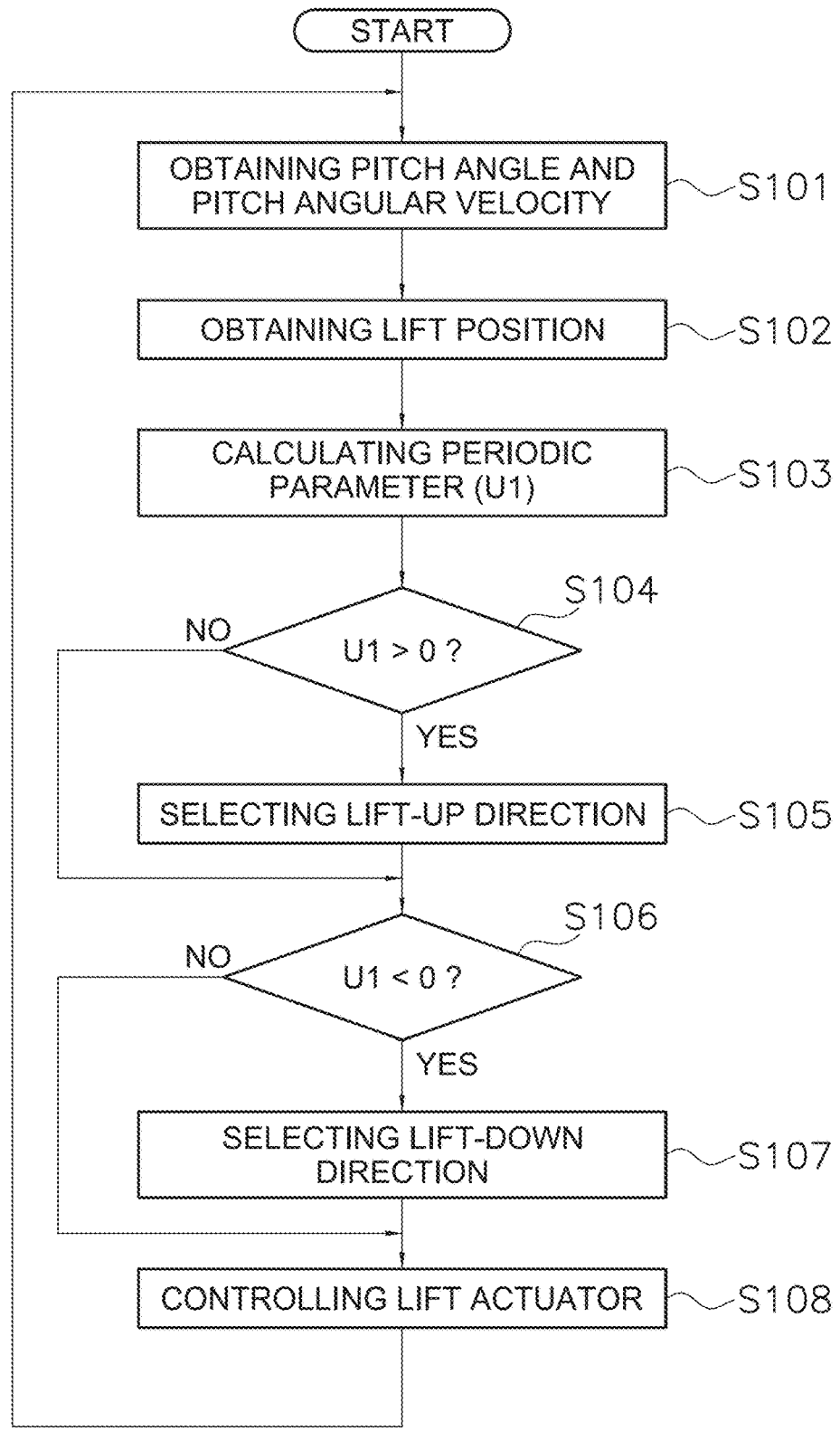
FIG. 4 is a flowchart for showing a series of processes of porpoising inhibiting control.

The controller 20 controls the lift motion based on the pitch angle of the watercraft 100, the pitch angular velocity thereof, and the lift position of the outboard motor 1 to execute porpoising inhibiting control to inhibit porpoising. The porpoising inhibiting control will be hereinafter explained. FIG. 4 is a flowchart showing a series of processes of the porpoising inhibiting control.

As shown in FIG. 4, in step S101, the controller 20 obtains a pitch angle and a pitch angular velocity thereof. The controller 20 receives a pitch angle signal and obtains the pitch angle and the pitch angular velocity thereof from the pitch angle signal.

In step S102, the controller 20 obtains a lift position. The controller 20 receives a lift position signal and obtains the lift position from the lift position signal. In step S103, the controller 20 calculates a periodic parameter. The periodic parameter is a parameter calculated based on the pitch angle of the watercraft 100, the pitch angular velocity thereof, and the lift position of the outboard motor 1. The value of the periodic parameter periodically varies with a variation in the pitch angle of the watercraft 100 and the pitch angular velocity thereof during the occurrence of porpoising of the watercraft 100. The periodic parameter is expressed by the following formula (1).

$$U1 = a1 \times (\theta p - \theta p^*) + a2 \times d\theta p + a3(Hs - Hs^*) \tag{1}$$

"U1" indicates the periodic parameter. "θp" indicates the pitch angle of the watercraft 100. "dθp" indicates the pitch angular velocity of the watercraft 100. "Hs" indicates the lift position. "a1", "a2", and "a3" indicate predetermined coefficients that are set depending on the type and the state of the watercraft 100 and those of the outboard motor 1. "θp*" indicates an equilibrium pitch angle of the watercraft 100 during navigation. "Hs*" indicates a target lift position of the outboard motor 1 during navigation. The periodic parameter periodically varies between a negative value and a positive value during the occurrence of porpoising of the watercraft 100.

In step S104, the controller 20 determines whether or not the periodic parameter is greater than 0. When it is determined that the periodic parameter is greater than 0, the controller 20 sets the lift-up direction as a lift direction in step S105.

In step S106, the controller 20 determines whether or not the periodic parameter is less than 0. When it is determined that the periodic parameter is less than 0, the controller 20 sets the lift-down direction as the lift direction in step S107.

In step S108, the controller 20 controls the lift actuator 18 to cause the outboard motor 1 to perform the lift motion in the lift direction. In other words, the controller 20 causes the outboard motor 1 to perform the lift motion in the lift-up direction when the periodic parameter becomes greater than 0. Conversely, the controller 20 causes the outboard motor 1 to perform the lift motion in the lift-down direction when the periodic parameter becomes less than 0. The controller 20 repeatedly executes the processes in steps S101 to S108.

Figure 5:
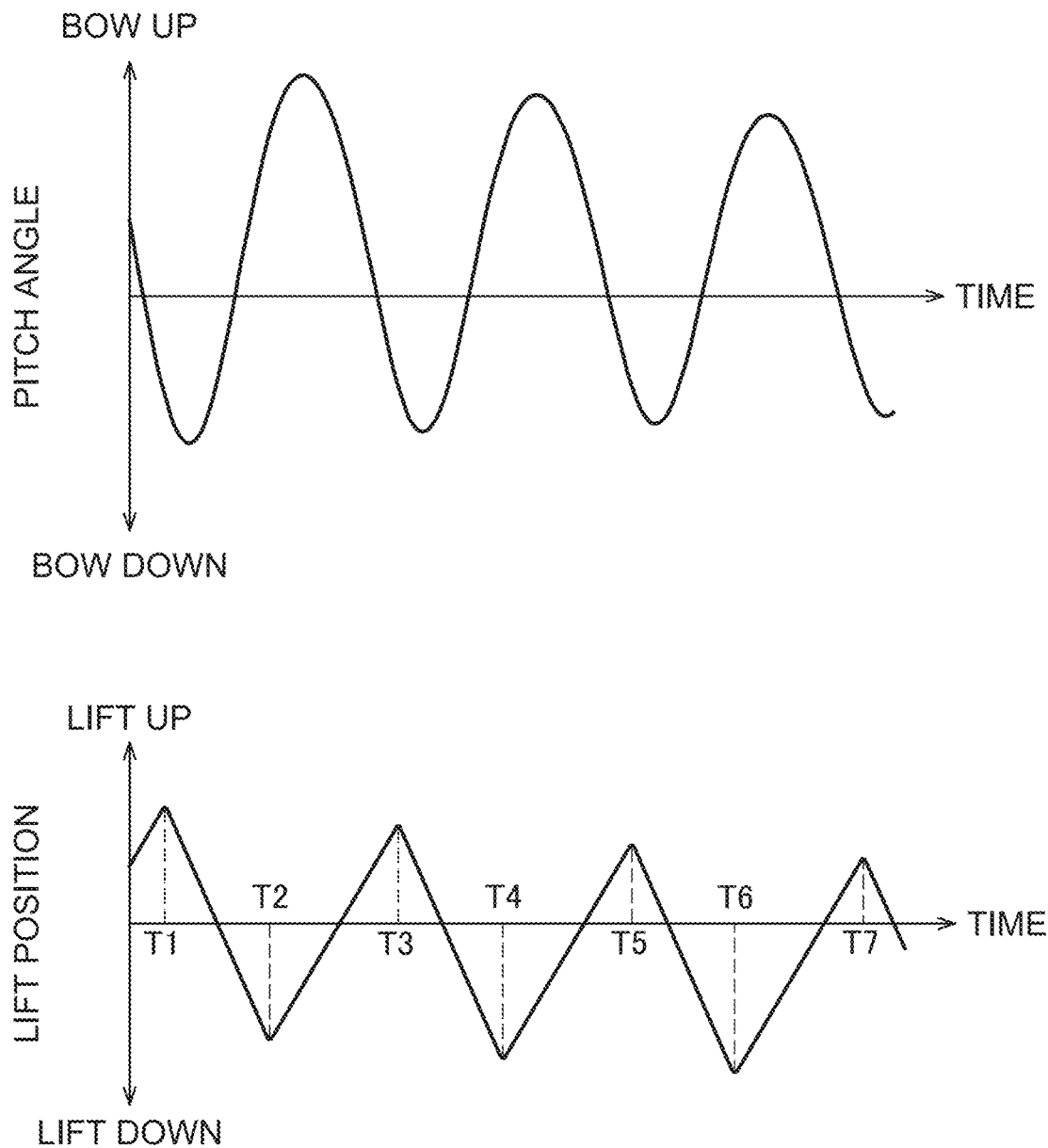
FIG. 5 includes a chart for showing a variation in a pitch angle of the watercraft during the occurrence of porpoising and a chart for showing a variation in a lift position caused by the porpoising inhibiting control.

FIG. 5 includes charts for showing a variation in a lift position caused by the porpoising inhibiting control with respect to variation in pitch angle of the watercraft 100 during the occurrence of porpoising. As shown in FIG. 5, during the occurrence of porpoising, the pitch angle of the watercraft 100 varies periodically. At time T1, the controller 20 determines that the periodic parameter becomes less than 0. Based on this, the controller 20 causes the outboard motor 1 to perform the lift motion in the lift-down direction. The controller 20 causes the outboard motor 1 to perform the lift motion in the lift-down direction from time T1 to time T2.

At time T2, the controller 20 determines that the periodic parameter becomes greater than 0. Based on this, the controller 20 causes the outboard motor 1 to perform the lift motion in the lift-up direction. The controller 20 causes the outboard motor 1 to perform the lift motion in the lift-up direction from time T2 to time T3.

Likewise, subsequently, the controller 20 causes the outboard motor 1 to perform the lift motion in the lift-down direction from time T3 to time T4. The controller 20 causes the outboard motor 1 to perform the lift motion in the lift-up direction from time T4 to time T5. The controller 20 causes the outboard motor 1 to perform the lift motion in the lift-down direction from time T5 to time T6. The controller 20 causes the outboard motor 1 to perform the lift motion in the lift-up direction from time T6 to time T7.

It should be noted that the controller 20 may execute the porpoising inhibiting control described above when a predetermined start condition is satisfied. The start condition indicates the occurrence of porpoising of the watercraft 100. For example, the start condition includes periodic variation in pitch angle at about 0.1 Hz or greater.

In the control system for the outboard motor 1 according to a preferred embodiment of the present invention, either the lift-up direction or the lift-down direction is selectively set as the lift direction based on the pitch angle of the watercraft 100, the pitch angular velocity thereof, and the lift position of the outboard motor 1. Because of this, the lift direction is able to be set by accurately determining the behavior of the watercraft 100 during the occurrence of porpoising. Then, the outboard motor 1 is caused to perform the lift motion in the set lift direction such that porpoising is alleviated. Consequently, a reduction in the velocity of the watercraft 100 is inhibited, and simultaneously porpoising is alleviated.

Figure 6A:
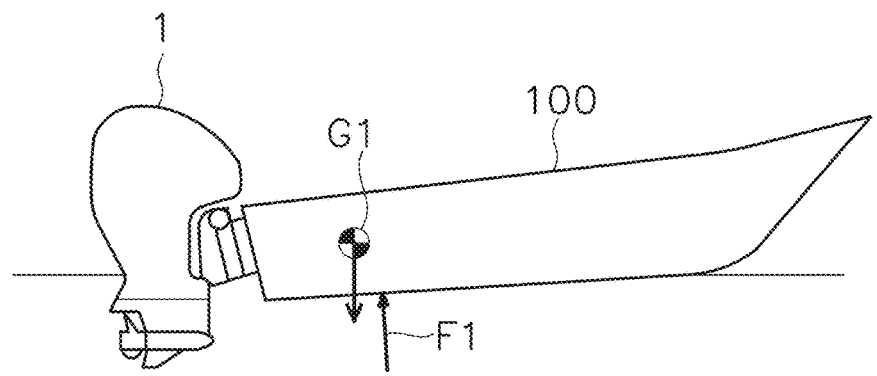
FIG. 6A is a diagram for showing an example of a behavior of the watercraft and a lift motion of the outboard motor during the occurrence of porpoising.
Figure 6B:
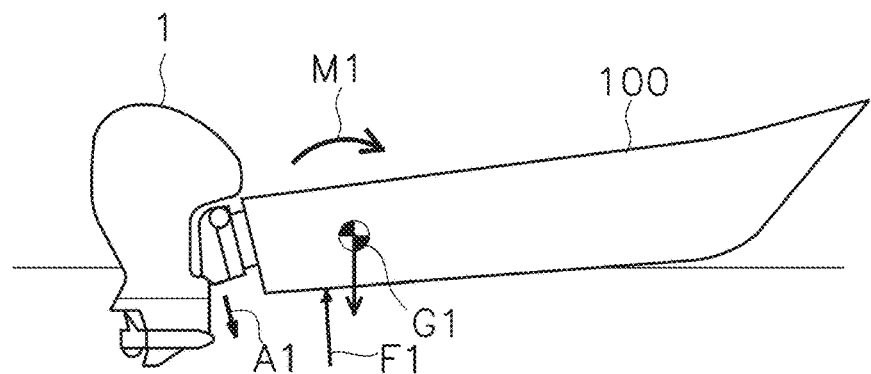
FIG. 6B is a diagram for showing the example of the behavior of the watercraft and the lift motion of the outboard motor during the occurrence of porpoising.
Figure 6C:
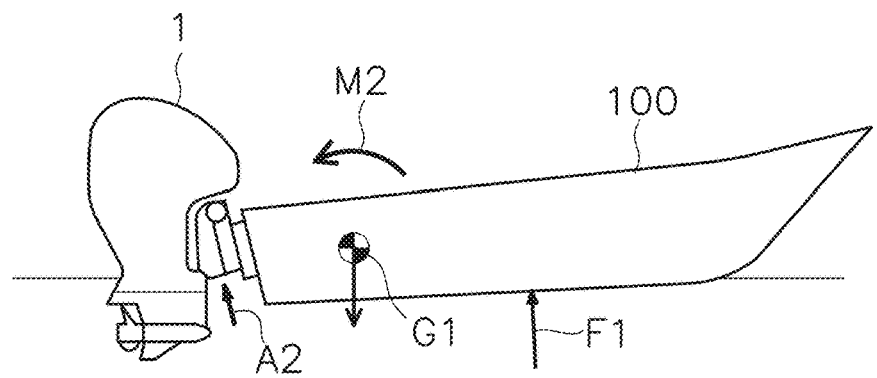
FIG. 6C is a diagram for showing the example of the behavior of the watercraft and the lift motion of the outboard motor during the occurrence of porpoising.

For example, FIGS. 6A to 6C are diagrams for showing an example of the behavior of the watercraft 100 and the lift motion of the outboard motor 1 during the occurrence of porpoising. During the occurrence of porpoising, as shown in FIG. 6A, a lift F1 acts on a position forward of a center-of-gravity G1 of the watercraft 100 such that the bow of the watercraft 100 is elevated. When the bow of the watercraft 100 is elevated as shown in FIG. 6B, the position on which the lift F1 acts is shifted aft of the center-of-gravity G1. Accordingly, a moment M1 acts on the watercraft 100 to lower the bow of the watercraft 100. At this time, during the porpoising inhibiting control, the controller 20 causes the outboard motor 1 to perform the lift motion in the lift-down direction as indicated by arrow A1. Accordingly, a moment, which is generated by the thrust of the outboard motor 1 and directed to elevate the bow of the watercraft 100, is increased in magnitude such that the moment M1 directed to lower the bow of the watercraft 100 is canceled out.

Conversely, when the bow of the watercraft 100 is lowered as shown in FIG. 6C, the position on which the lift F1 acts is shifted forward of the center-of-gravity G1. Accordingly, a moment M2 acts on the watercraft 100 to elevate the bow of the watercraft 100. At this time, during the porpoising inhibiting control, the controller 20 causes the outboard motor 1 to perform the lift motion in the lift-up direction as indicated by arrow A2. Accordingly, a moment, which is generated by the thrust of the outboard motor 1 and directed to elevate the bow of the watercraft 100, is reduced in magnitude such that the moment M2 directed to elevate the bow of the watercraft 100 is canceled out. As described above, the moment M1, M2, directed to lower/elevate the bow of the watercraft 100, is reduced in magnitude by the lift motion of the outboard motor 1. Consequently, the occurrence of porpoising of the watercraft 100 is inhibited.

During the porpoising inhibiting control described above, the lift motion of the outboard motor 1 in the lift-up direction and that in the lift-down direction are equal or substantially equal in duration to each other. However, the lift motion of the outboard motor 1 in the lift-up direction and that in the lift-down direction are different in velocity from each other due to the posture of the watercraft 100 or the outboard motor 1. Because of this, even when the lift motion of the outboard motor 1 in the lift-up direction and that in the lift-down direction are performed for an equal duration, it is difficult to keep the lift position of the outboard motor 1 at a target position. For example, when a lift, directed downward, acts on the outboard motor 1 due to the posture of the watercraft 100 or the outboard motor 1, a median of the lift position is likely to vary to the lift-down directional side as shown in FIG. 5.

Figure 7:
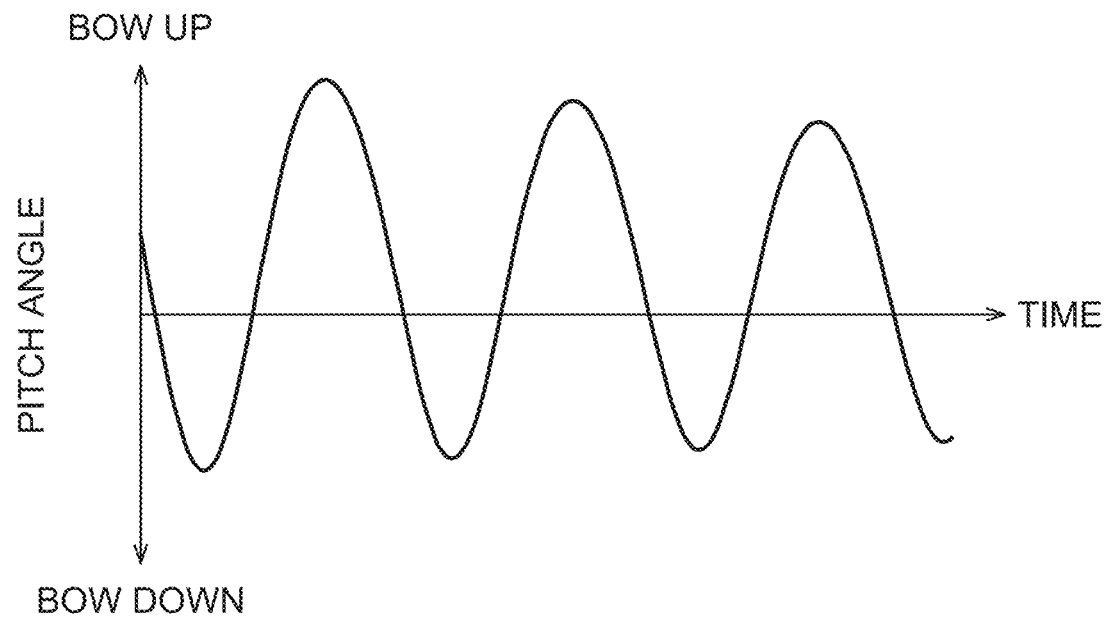
FIG. 7 includes a chart for showing a variation in a pitch angle of the watercraft during the occurrence of porpoising and a chart for showing a variation in a lift position caused by the porpoising inhibiting control.
Figure 7:
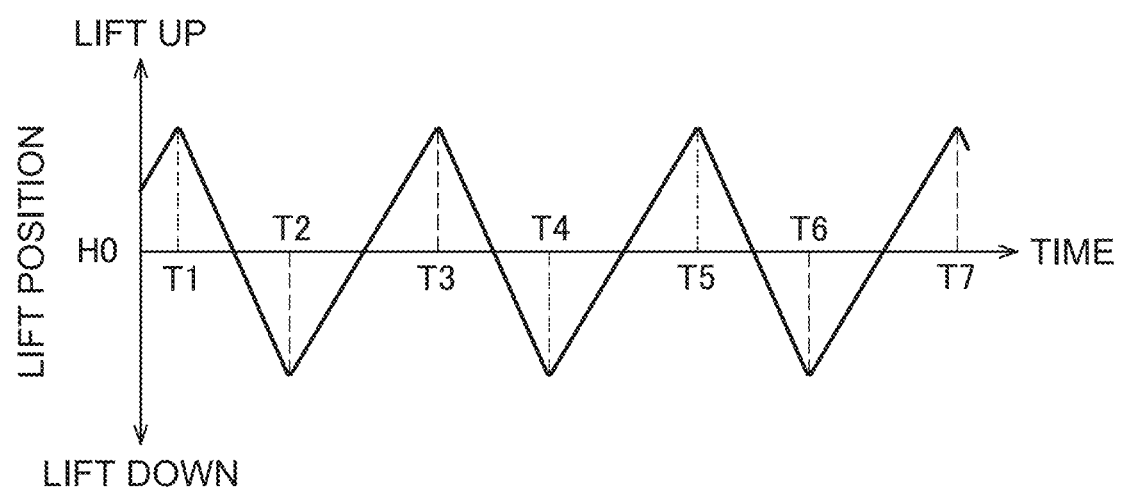

In this case, when the outboard motor 1 is caused to perform the lift motion in the lift-up direction, the controller 20 sets the duration of the lift motion to be longer than when the outboard motor 1 is caused to perform the lift motion in the lift-down direction. For example, as shown in FIG. 7, the controller 20 sets the duration T2-T3, T4-T5, T6-T7 of the lift motion in the lift-up direction to be longer than the duration T1-T2, T3-T4, T5-T6 of the lift motion in the lift-down direction. Accordingly, the median of the lift position is kept at a target position H0.

Conversely to the above, when a lift, directed upward, acts on the outboard motor 1 due to the posture of the watercraft 100 or the outboard motor 1, the median of the lift position is likely to vary to the lift-up directional side. In this case, when the outboard motor 1 is caused to perform the lift motion in the lift-down direction, the controller 20 sets the duration of the lift motion to be longer than when the outboard motor 1 is caused to perform the lift motion in the lift-up direction.

Preferred embodiments of the present invention have been explained above. However, the present invention is not limited to the preferred embodiments described above, and a variety of changes can be made without departing from the gist of the present invention.

Instead of the outboard motor 1, another type of marine propulsion device such as an inboard engine outboard drive or a jet propulsion device may be used. The structure of the outboard motor 1 is not limited to that in the preferred embodiments described above and may be changed. For example, the drive unit 2 is not limited to the internal combustion engine, and alternatively, may be an electric motor. Yet alternatively, the drive unit 2 may be a hybrid system of an internal combustion engine and an electric motor. The outboard motor 1 is not limited in number to one. The outboard motor 1 may be two or more in number.

The periodic parameter is not limited to that in the preferred embodiments described above and may be changed. For example, in the preferred embodiments described above, the periodic parameter includes the pitch angle of the watercraft 100, the pitch angular velocity thereof, and the lift position of the outboard motor 1. However, the pitch angle of the watercraft 100 may be omitted from the periodic parameter. Alternatively, the pitch angular velocity may be omitted from the periodic parameter. Another variable such as a trim angle may be added to the periodic parameter.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a behavior of a watercraft, the system comprising:
   an outboard motor attachable to the watercraft and operable to perform a lift motion up and down;
   a bracket including a first lift bracket attached to the watercraft and a second lift bracket attached to the outboard motor, the second lift bracket being slidable up and down with respect to the first lift bracket;
   a lift actuator to cause the outboard motor to perform the lift motion in a lift-up direction and a lift-down direction by causing the second lift bracket to slide against the first lift bracket;
   a sensor to detect motion information indicating an up-and-down directional motion of a bow of the watercraft; and
   a controller communicably connected to the lift actuator and configured or programmed to:
   obtain the motion information;
   selectively set either the lift-up direction or the lift-down direction as a lift direction in accordance with the up-and-down directional motion of the bow based on the motion information;
   control the lift actuator to cause the outboard motor to perform the lift motion in the lift direction; and
   set a duration of the lift motion to be different between when the outboard motor is caused to perform the lift motion in the lift-up direction and when the outboard motor is caused to perform the lift motion in the lift-down direction.

2. The system according to claim 1, wherein
the motion information includes a lift position of the outboard motor and at least either of a pitch angle of the watercraft and an angular velocity of the pitch angle; and
the controller is configured or programmed to selectively set either the lift-up direction or the lift-down direction as the lift direction based on the lift position of the outboard motor and at least either of the pitch angle of the watercraft and the angular velocity of the pitch angle.

3. A method of controlling a behavior of a watercraft including an outboard motor operable to perform a lift motion up and down, a bracket including a first lift bracket attached to the watercraft and a second lift bracket attached to the outboard motor, and a lift actuator to cause the outboard motor to perform the lift motion in a lift-up direction and a lift-down direction, the method comprising:
   obtaining motion information indicating an up-and-down directional motion of a bow of the watercraft;
   selectively setting either the lift-up direction or the lift-down direction as a lift direction in accordance with the up-and-down directional motion of the bow based on the motion information;
   controlling the lift actuator to cause the outboard motor to perform the lift motion in the lift direction by causing the second lift bracket to slide against the first lift bracket; and
   setting a duration of the lift motion to be different between when the outboard motor is caused to perform the lift motion in the lift-up direction and when the outboard motor is caused to perform the lift motion in the lift-down direction.

4. The method according to claim 3, wherein the motion information includes a lift position of the outboard motor and at least either of a pitch angle of the watercraft and an angular velocity of the pitch angle, the method further comprising:
   selectively setting either the lift-up direction or the lift-down direction as the lift direction based on the lift position of the outboard motor and at least either of the pitch angle of the watercraft and the angular velocity of the pitch angle.

5. A system for controlling a behavior of a watercraft, the system comprising:
   a marine propulsion device attachable to the watercraft and operable to perform a lift motion up and down;
   a bracket including a first lift bracket attached to the watercraft and a second lift bracket attached to the outboard motor, the second lift bracket being slidable up and down with respect to the first lift bracket;
   a lift actuator to cause the marine propulsion device to perform the lift motion in a lift-up direction and a lift-down direction by causing the second lift bracket to slide against the first lift bracket;
   a sensor to detect motion information indicating an up-and-down directional motion of a bow of the watercraft; and
   a controller communicably connected to the lift actuator and configured or programmed to:
      obtain the motion information;
      selectively set either the lift-up direction or the lift-down direction as a lift direction in accordance with the up-and-down directional motion of the bow based on the motion information;
      control the lift actuator to cause the marine propulsion device to perform the lift motion in the lift direction; and
      set a duration of the lift motion to be different between when the marine propulsion device is caused to perform the lift motion in the lift-up direction and when the marine propulsion device is caused to perform the lift motion in the lift-down direction.

* * * * *